(12) United States Patent
Jia

(10) Patent No.: US 9,945,595 B2
(45) Date of Patent: Apr. 17, 2018

(54) DEFROSTING VALVE

(71) Applicant: YANTAI JIAYOU ELECTRICAL MECHANICAL TECHNOLOGY CO., LTD, Yantai (CN)

(72) Inventor: Peiyu Jia, Yantai (CN)

(73) Assignee: YANTAI JIAYOU ELECTRICAL MECHANICAL TECHNOLOGY CO., LTD, Yantai (CN)

( * ) Notice: Subject to any disclaimer, the term of this patent is extended or adjusted under 35 U.S.C. 154(b) by 0 days.

(21) Appl. No.: 15/473,574

(22) Filed: Mar. 29, 2017

(65) Prior Publication Data

US 2017/0205127 A1 Jul. 20, 2017

Related U.S. Application Data

(63) Continuation of application No. PCT/CT2015/091147, filed on Sep. 29, 2015.

(30) Foreign Application Priority Data

Sep. 30, 2014 (CN) .......................... 2014 1 0515612

(51) Int. Cl.
F16K 31/122 (2006.01)
F25B 47/02 (2006.01)
F25B 41/04 (2006.01)

(52) U.S. Cl.
CPC .......... F25B 47/025 (2013.01); F25B 41/046 (2013.01); F25B 2347/021 (2013.01)

(58) Field of Classification Search
CPC .... F16K 11/044; F25B 47/025; F25B 41/046; F25B 2347/021; Y10T 137/2544; Y10T 137/7771; Y10T 137/7772; Y10T 137/7777; Y10T 137/7925;
(Continued)

(56) References Cited

U.S. PATENT DOCUMENTS 2,706,487 A * 4/1955 Wilson .................... B60T 15/42
137/102
2,828,767 A * 4/1958 Barusch .............. F16K 11/0655
137/625.29
(Continued)

*Primary Examiner* — Minh Le
(74) *Attorney, Agent, or Firm* — Wayne & King LLC

(57) ABSTRACT

Disclosed in the present invention is a defrosting valve, characterized by comprising a valve body provided with a valve core therein and an upper cover thereon; a push piston is disposed in the valve core; the push piston is in a T-shape; the upper part of the push piston is inserted in the cavity of the upper cover; a return tension spring is sleeved at the lower part of the upper cover; the upper end of the return tension spring is connected to the upper cover, and the lower end is connected to the lower end of the push piston; a lower table top is disposed at the lower part in the valve body; a flow channel inlet is disposed on the upper cover; a bidirectional flow channel opening is disposed on the side wall of the valve body; and a flow channel outlet is disposed at the lower end of the valve body. Compared to the prior art, the present invention has the following positive effects: the present invention has a simple and reasonable structure and a long service life, and can sectionally defrost an evaporator, thus greatly improving the heating efficiency of an air-conditioner.

7 Claims, 13 Drawing Sheets

(58) Field of Classification Search
CPC ..... Y10T 137/87193; Y10T 137/87217; Y10T 137/87169
USPC .. 137/596.17, 102, 596.14, 596.2, 596, 493, 137/493.1, 493.6, 538, 625.43; 62/140, 62/324.6; 236/80 R
See application file for complete search history.

(56) References Cited

U.S. PATENT DOCUMENTS

| | | | | |
|---|---|---|---|---|
| 3,747,626 A | * | 7/1973 | Valentino | F16K 15/18 137/102 |
| 4,057,074 A | * | 11/1977 | Fischer | F16K 11/02 137/107 |
| 4,492,252 A | * | 1/1985 | Kanai | F25B 41/046 137/625.43 |
| 4,644,760 A | * | 2/1987 | Aoki | F25B 41/046 137/625.43 |
| 4,760,709 A | * | 8/1988 | Aoki | F25B 41/046 137/625.43 |
| 4,877,046 A | * | 10/1989 | Albrigtsen | F16K 11/04 137/107 |
| 5,694,965 A | * | 12/1997 | Roulet | G05D 16/10 137/102 |
| 6,619,431 B2 | * | 9/2003 | Wilcox | F16C 33/6625 184/105.3 |
| 6,648,010 B1 | * | 11/2003 | Goodwin | F16K 15/03 137/491 |
| 6,684,651 B1 | * | 2/2004 | Yoshizawa | F16K 11/0655 137/625.43 |
| 6,830,073 B2 | * | 12/2004 | Lee | F15B 13/0406 137/625.43 |
| 7,152,416 B2 | * | 12/2006 | Lifson | F16K 11/0655 62/160 |
| 8,191,376 B2 | * | 6/2012 | Fox | F25B 13/00 62/174 |
| 8,234,877 B2 | * | 8/2012 | Beekman | F16K 31/1223 251/213 |
| 2011/0088427 A1 | * | 4/2011 | Ishii | F16K 11/0655 62/529 |
| 2016/0061337 A1 | * | 3/2016 | Teller | F02M 37/0064 137/10 |

* cited by examiner

DEFROSTING VALVE

CROSS-REFERENCE TO RELATED APPLICATIONS

This application is a continuation of International Patent Application No. PCT/CN2015/091147 with an international filing date of Sep. 29, 2015, designating the United States, now pending, and further claims priority benefits to Chinese Patent Application No. 201410515612A, filed Sep. 30, 2014. The contents of all of the aforementioned applications, including any intervening amendments thereto, are incorporated herein by reference.

TECHNICAL FIELD

The present invention relates to a defrosting valve, and belongs to the technical field of air-conditioners. The defrosting valve is used to defrost an evaporator when an air-conditioner is heating.

BACKGROUND

When an air-conditioner is heating, the evaporator will defrost, and too thick frost will reduce the heating efficiency. Therefore, the evaporator is required to be defrosted. The existing defrosting mode is using a four-way valve to change air flow direction to defrost the evaporator wholly. When in defrost, the condenser becomes an evaporator, and heating is forced to stop, thus reducing the heating efficiency of the air-conditioner.

SUMMARY

The present invention aims to overcome the deficiencies of the prior art and sectionally defrost an evaporator while the air-conditioner does not stop heating, namely, when in defrost, one set of evaporator is defrosted, another set of evaporator keeps on operating, thus greatly improving the efficiency and comfortability of the air-conditioner. The defrosting valve has a simple and reasonable structure and a long service life.

A defrosting valve, characterized by comprising a valve body provided with a valve core therein and an upper cover thereon; a push piston is disposed in the valve core; the push piston is in a T-shape; the upper part, of the push piston is inserted in the cavity of the upper cover; a return tension spring is sleeved at the lower part of the upper cover; the upper end of the return tension spring is connected to the upper cover, and the lower end is connected to the lower end of the push piston; a lower table top is disposed at the lower part in the valve body; a flow channel inlet is disposed on the upper cover; a bidirectional flow channel opening is disposed on the side wall of the valve body; and a flow channel outlet is disposed at the lower end of the valve body.

The calibers of the bidirectional flow channel opening and the flow channel outlet are both greater than the caliber of the flow channel inlet.

The distance from the lower table top to the upper edge of the flow channel opening is less than the diameter of the flow channel opening.

The height of the valve core is greater than the diameter of the bidirectional flow channel opening.

The push piston is in a linear shape.

A sealing gasket is disposed at the lower end of the valve core.

A flow channel is disposed in the push piston; a small valve core is disposed in the flow channel at the lower part of the push piston; a spring is sleeved on the small valve core; the upper end of the spring is connected to the small valve core, and the lower end is connected to the valve core; the valve core is provided with a through hole thereon; and the lower end of the small valve core corresponds to the through hole.

The upper cover of the defrosting valve is connected to the defrosting solenoid valve; and the flow channel inlet of the upper cover is integrally connected to the air outlet of the defrosting solenoid valve.

The objective of the present invention is achieved by the following measures: a defrosting valve, comprising a valve body provided with a valve core therein and an upper cover thereon; a push piston is disposed in the valve core; a return tension spring is sleeved at the lower part of the upper cover; the upper end of the return tension spring is connected to the upper cover, and the lower end is connected to the lower end of the push piston; a lower table top is disposed at the lower part in the valve body; a flow channel inlet is disposed on the upper cover; a bidirectional flow channel opening is disposed on the side wall of the valve body; and a flow channel outlet is disposed at the lower end of the valve body.

Compared to the prior art, the present invention has the following positive effects: the present invention has a simple and reasonable structure and a long service life, and can sectionally defrost an evaporator, thus greatly improving the heating efficiency of an air-conditioner.

DETAILED DESCRIPTION OF THE PREFERRED EMBODIMENT

Figure 1:
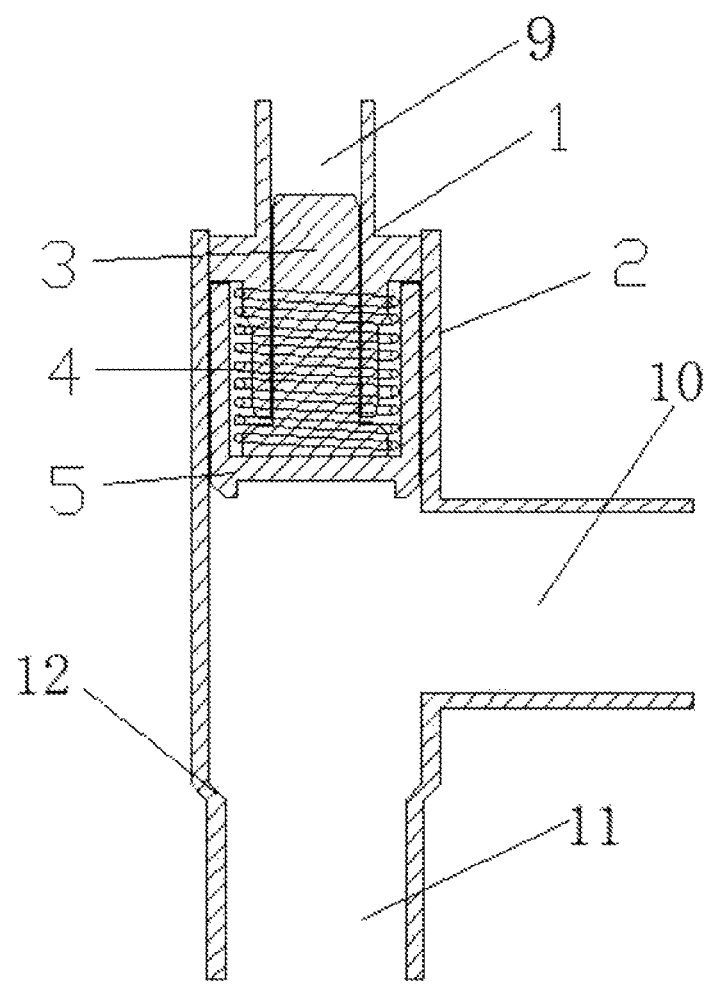
FIG. 1 is a structural schematic diagram of the first embodiment of the present invention.
Figure 2:
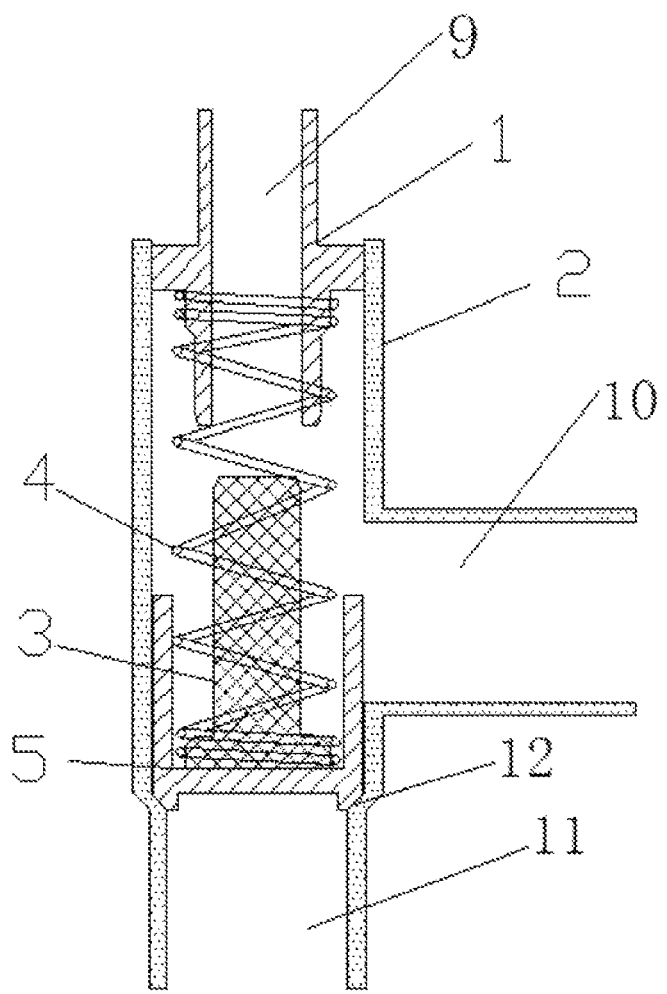
FIG. 2 is a schematic diagram of the defrosting valve in an operating mode as shown in FIG. 1.

The preferred embodiments of the present invention will be detailed hereafter in connection with the drawings:

Embodiment 1: a defrosting valve (see FIGS. 1-2), comprising a valve body 2 provided with a valve core 5 therein and an upper cover 1 thereon; a push piston 3 is disposed in the valve core 5; the diameter of the push piston 3 is less than the diameter of the valve core 5; the push piston 3 is in a T-shape; the upper part of the push piston 3 is inserted in the cavity of the upper cover 1, thus reducing the pressure receiving section area and the force applied to the valve core 5 by the push piston 3; a return tension spring 4 is sleeved at the lower part of the upper cover 1; the upper end of the return tension spring 4 is connected to the upper cover 1, and the lower end is connected to the lower end of the push piston 3, thus reducing the size of the valve body; a lower table top 12 is disposed at the lower part in the valve body 2; a flow channel inlet 9 is disposed on the upper cover 1; a bidirectional flow channel opening 10 is disposed on the side wall of the valve body 2; and a flow channel outlet 11 is disposed at the lower end of the valve body 2. When the defrosting valve does not defrost, no pressure exists at the flow channel inlet 9; the valve core 5 is disposed at the upper part of the valve body under the effect of the return tension spring 4, in which case the bidirectional flow channel opening 10 is communicated with the flow channel outlet 11.

When high temperature and pressure air appears at the flow channel inlet 9, the push piston 3 moves downwards under the effect of pressure, and drives the valve core 5 to move downwards; when the lower surface of the valve core is integrated with the table top 12 of the valve body, the bidirectional flow channel opening 10 and the flow channel outlet 11 are closed, and the high temperature and pressure air at the flow channel inlet 9 flows out via the bidirectional flow channel opening 10 to defrost the evaporator.

When the high temperature and pressure air at the flow channel inlet 9 disappears, the pressure on the push piston 3 disappears; the valve core 5 automatically returns to the original position under the tensile force of the return tension spring 4; the bidirectional flow channel opening 10 is communicated with the flow channel outlet 11; and the air-conditioner continues the heating operation.

Due to the requirement for use environment, the smaller the flow resistance between the flow channel outlet 11 and the bidirectional flow channel opening 10 is, the better; and the flow resistance between the flow channel inlet 9 and the bidirectional flow channel opening 10 has no affect on performances. Therefore, the calibers of the bidirectional flow channel opening 10 and the flow channel outlet 11 are both greater at least one standard, 3 mm is preferred, than the caliber of the flow channel inlet 9. Also due to such use environment, the downward moving distance of the valve core 5 is less than two times of the diameter of the flow channel opening 10. Namely, when the valve core 5 closes the flow channel outlet 11, the upper edge of the valve core 5 is in the middle of the flow channel opening 10, eliminating the need for complete opening, such that not only the fluid requirement for the flow channel inlet 9 is satisfied, but also the size of the valve body is reduced.

In order to ensure the flow channel inlet 9, the flow channel opening 10 and the flow channel outlet 11 not to be all-communicated, the height of the valve core 5 is greater than the diameter of the bidirectional flow channel opening 10, which ensures that only the flow channel inlet 1 is communicated with the flow channel opening 10, or the flow channel opening 10 is communicated with the flow channel outlet 11, but the three channels are impossible to be all-communicated. The present invention adopts the structure of disposing the tension spring and the valve core 5 at the upper end of the valve body, such that no barriers exist at the bidirectional flow channel opening 10 and the flow channel outlet 11, and the resistance between the bidirectional flow channel opening 10 and the flow channel outlet 11 is extraordinarily low, thus reducing pressure loss, and improving the efficiency of the air-conditioner.

In the present invention, the pressure at the flow channel inlet 9 directly acts on the push piston 3. Since the diameter of the push piston 3 is less than the diameter of the valve core 5, the stressed area, the push force to the valve core 5, and the impact of the valve core 5 to the lower table top 12, are all reduced, thus not only improving the service life of the valve core 5, but also reducing the affect on the pipe system of the air-conditioner due to the impact vibration of the valve body 2.

Figure 12:
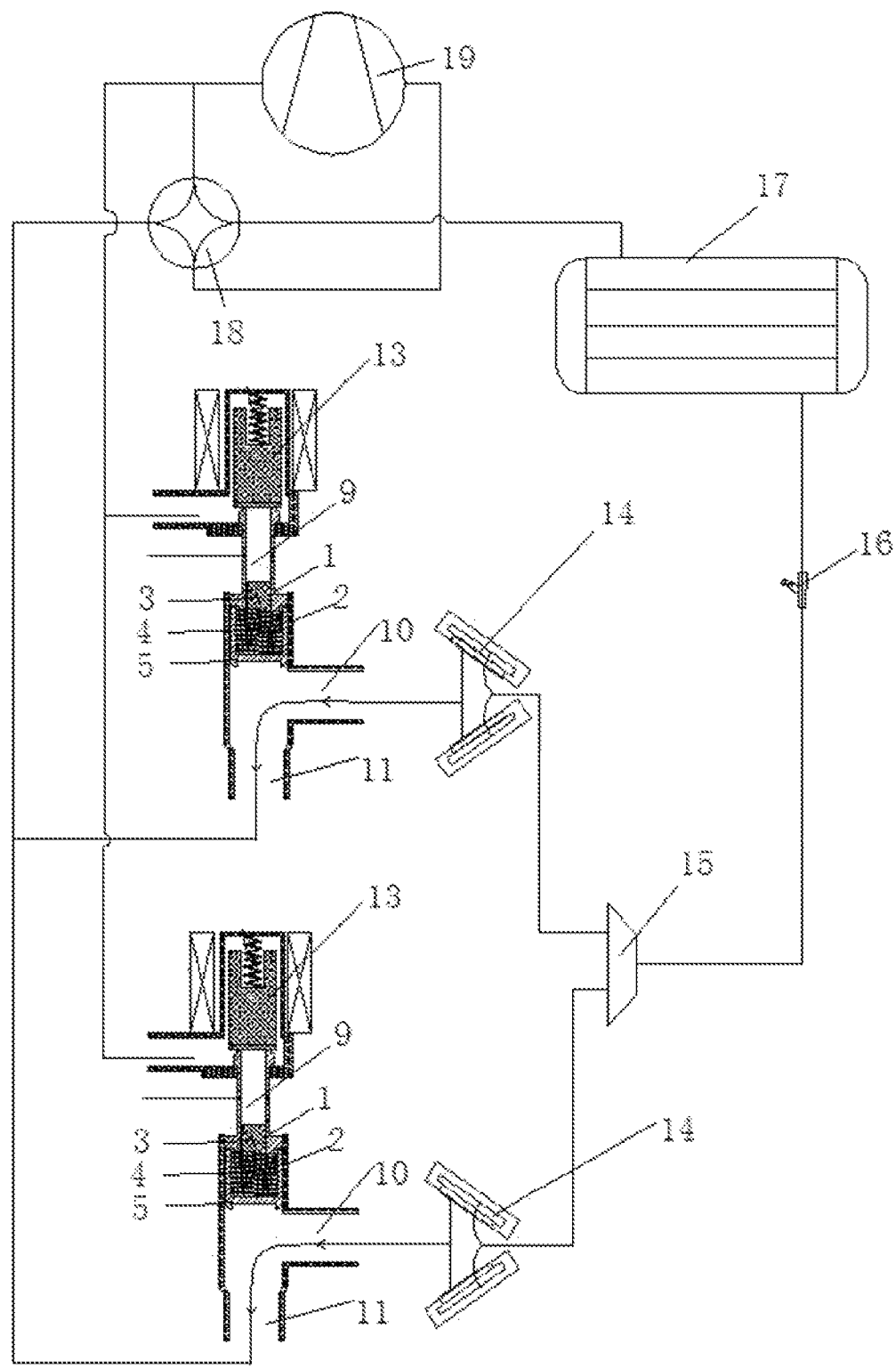
FIG. 12 is a diagram showing the heating state of an air-conditioner heating system in which the present invention is applied.
Figure 13:
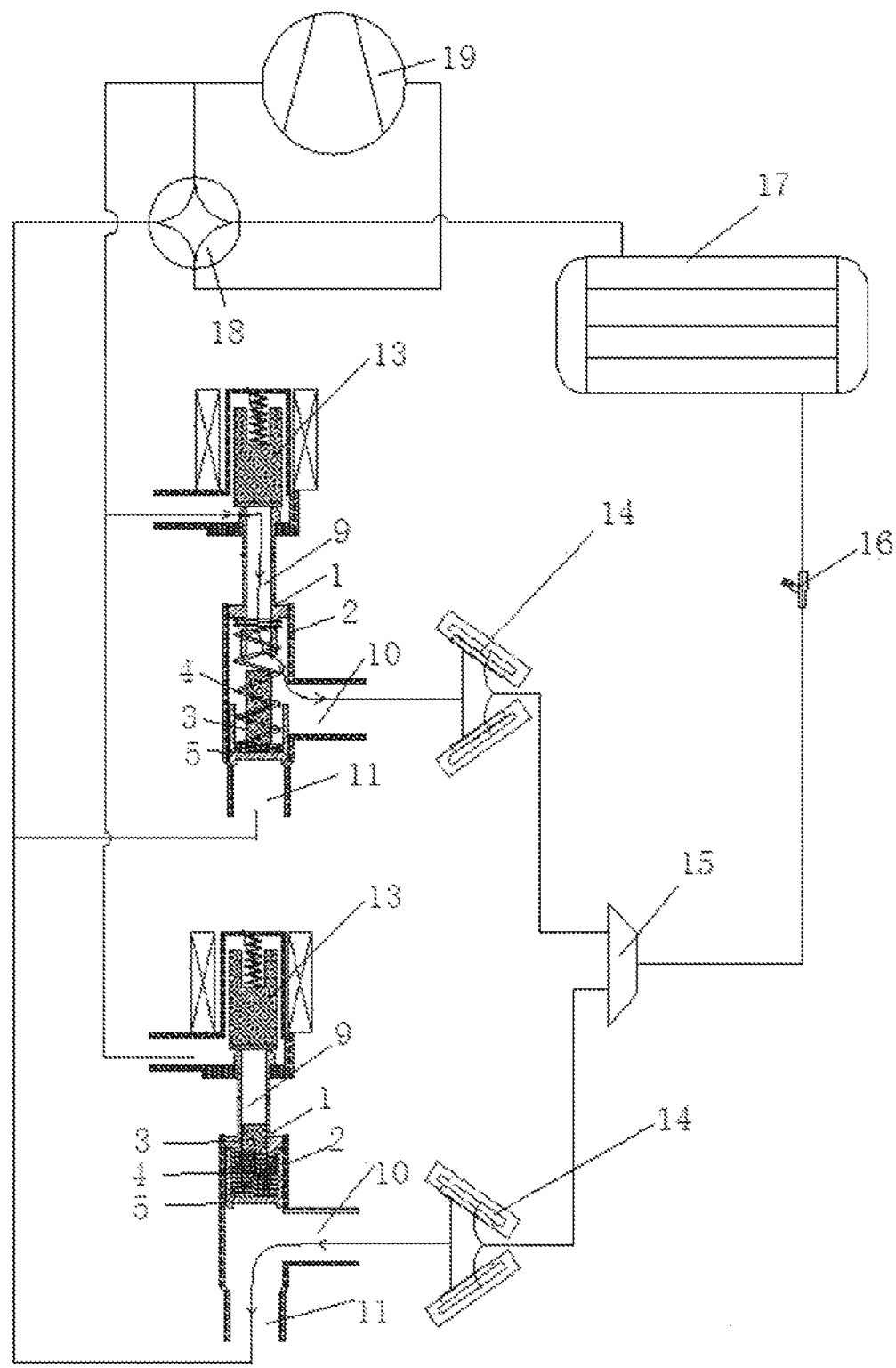
FIG. 13 is a diagram showing the defrosting state of an air-conditioner heating system in which the present invention is applied.

When the defrosting valve of the present invention is used in the heating system of an air-conditioner (see FIG. 12-13), as shown in the figures, two defrosting valves are connected to a defrosting solenoid valve 13, an evaporator 14, a distribution valve 15, an expansion valve 16, a condenser 17, a compressor 19 and a four-way change valve 18.

When defrosting is required (see FIG. 13), one defrosting solenoid valve 13 is opened, and another defrosting solenoid valve 13 is closed; the high temperature and pressure air flows in from the flow channel inlet 9; the push piston 3 moves downwards, and drives the valve core 5 to move downwards, until the valve core 5 seals the lower table top 12 of the valve body; the flow channel outlet 11 is closed; the flow channel inlet 9 is communicated with the bidirectional flow channel opening 10; the hot air flows across the flow channel inlet 9 and the bidirectional flow channel opening 10, and then arrives at the evaporator 14 to defrost the evaporator 14. After the defrosting is completed, the defrosting solenoid valve 13 is closed; the high temperature air at the flow channel inlet 9 disappears; the valve core 5 returns to the original position under the effect of the return tension spring 4; the bidirectional flow channel opening 10 is communicated with the flow channel outlet 11; and the evaporator 14 of the air-conditioner continues the operation. For the same reason, when another set of evaporator requires defrosting, the defrosting solenoid valve 13 is closed, and another defrosting solenoid valve 13 is opened to defrost another evaporator 14.

Figure 3:
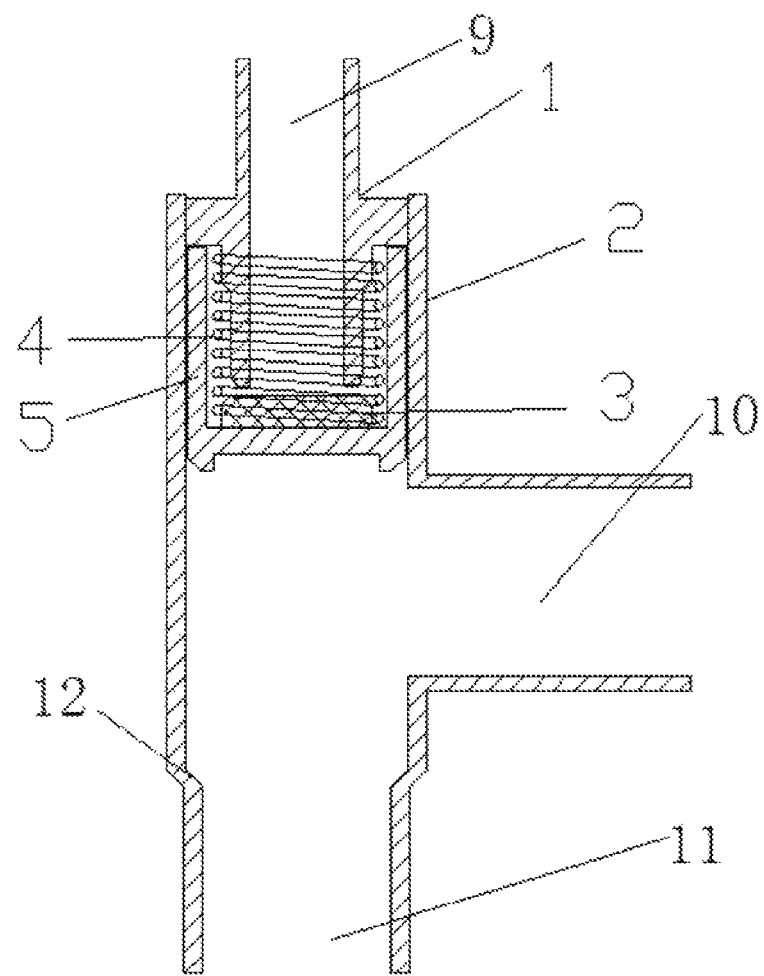
FIG. 3 is a structural schematic diagram of the second embodiment of the present invention.
Figure 4:
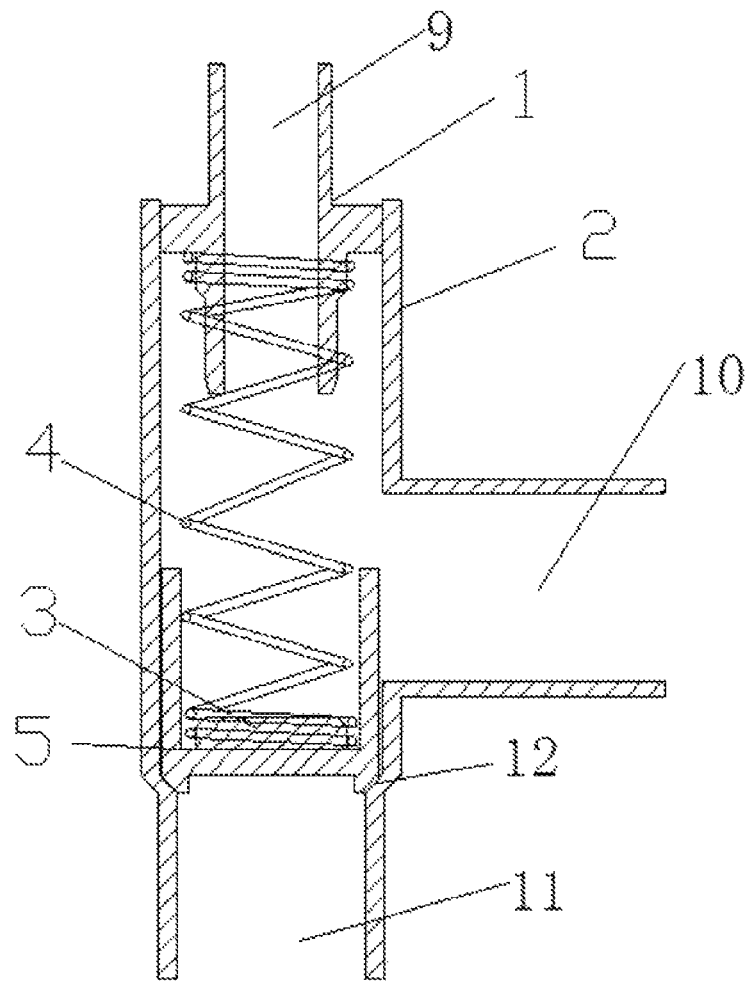
FIG. 4 is a schematic diagram of the defrosting valve in an operating mode as shown in FIG. 3.

Embodiment 2: a defrosting valve (see FIGS. 3-4), having basically the same structure and principle with that of embodiment 1, the differences thereof are: the push piston 3 is in a linear shape, and is suitable for small bore air-conditioners; since the diameter of the pipe is small and the generated impact force is not heavy, the upper part of the push piston can be removed.

Figure 5:
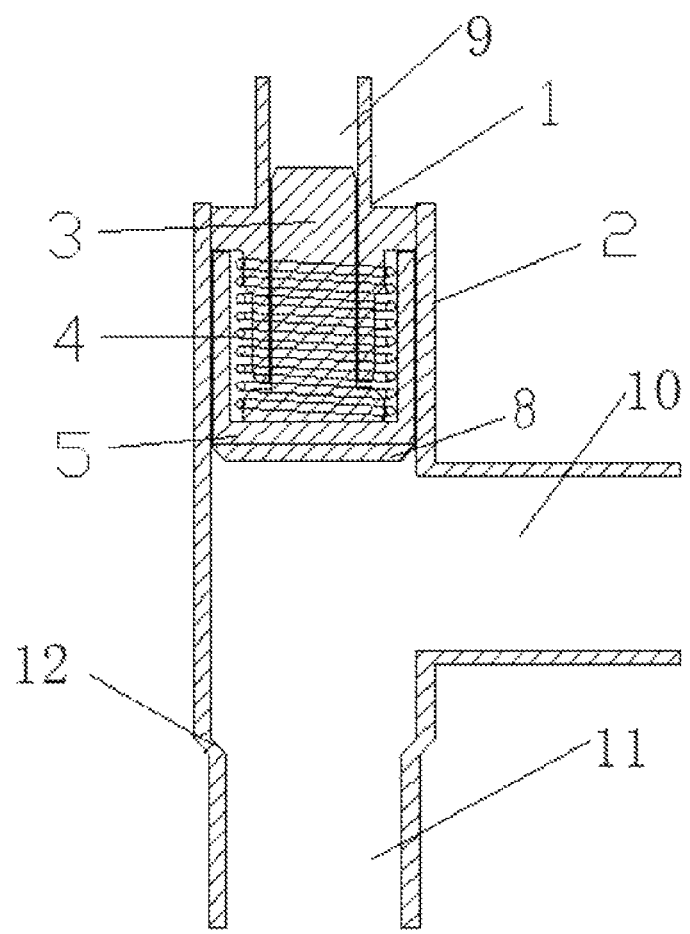
FIG. 5 is a structural schematic diagram of the third embodiment of the present invention.
Figure 6:
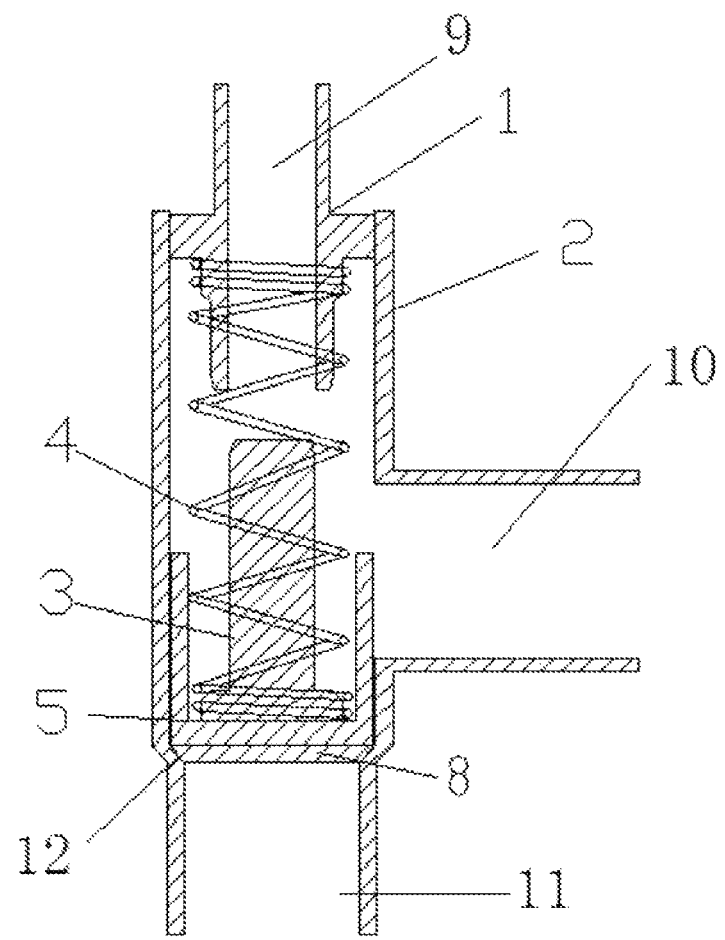
FIG. 6 is a schematic diagram of the defrosting valve in an operating mode as shown in FIG. 5.

Embodiment 3: a defrosting valve (see FIGS. 5-6), having basically the same structure and principle with that of embodiment 1; the differences thereof are: a sealing gasket 8 is disposed at the lower end of the valve core 5.

Figure 7:
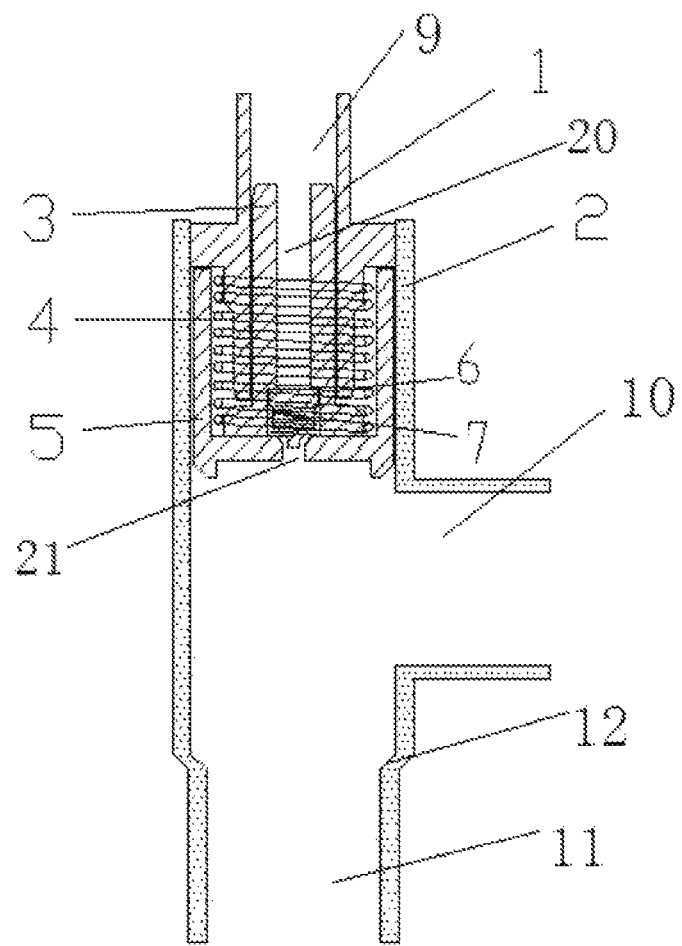
FIG. 7 is a structural schematic diagram of the fourth embodiment of the present invention.
Figure 8:
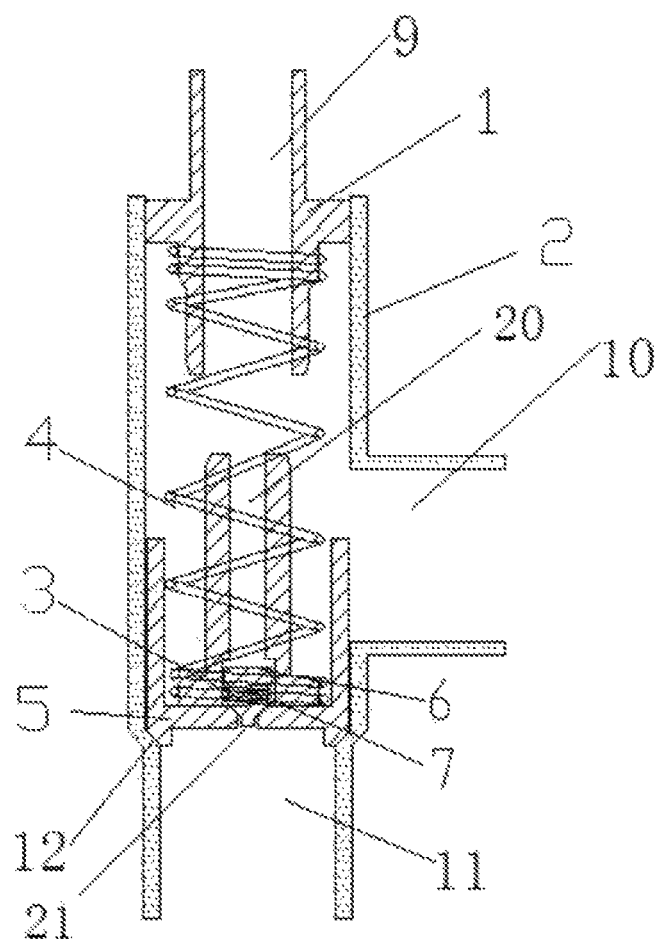
FIG. 8 is a schematic diagram of the defrosting valve in an operating mode as shown in FIG. 7.
Figure 9:
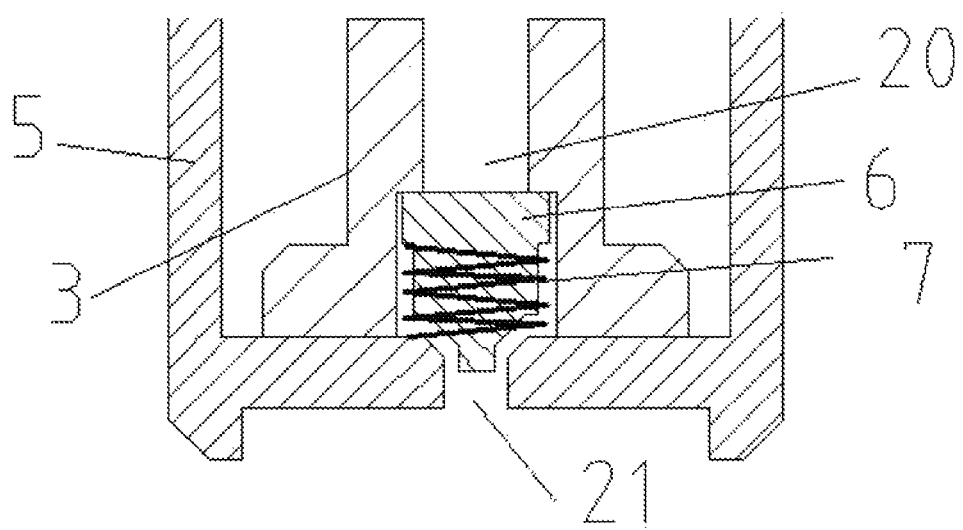
FIG. 9 is an enlarged diagram of a small valve core in FIG. 7.

Embodiment 4: a defrosting valve (see FIGS. 7-9), having basically the same structure and principle with that of embodiment 1; the differences thereof are: a flow channel 20 is disposed in the push piston 3; a small valve core 6 is disposed in the flow channel at the lower part of the push piston 3; a spring 7 is sleeved on the small valve core 6; the upper end of the spring 7 is connected to the small valve core 6, and the lower end is connected to the valve core 5; the valve core is provided with a through hole 21 thereon; and the lower end of the small valve core 6 corresponds to the through hole 21. Double-stage pressure differential pressure is required to open the defrosting valve in some occasions. After the evaporator defrosting is completed, the internal pressure will automatically reduce; when the pressure is reduced to the response pressure of the small valve core 6, the small valve core 6 is opened under the elastic force of the spring 7; the air in the bidirectional flow channel opening 10 flows to the flow channel 21 via the flow channel 20 to relieve the pressure of the evaporator; when the pressure is further reduced to the response pressure of a big valve core 5, the big valve core 5 moves upwards and returns to the original position under the effect of the return tension spring 4, in which case the bidirectional flow channel opening 10 is communicated with the flow channel outlet 11, and the air-conditioner continues the heating operation.

Figure 10:
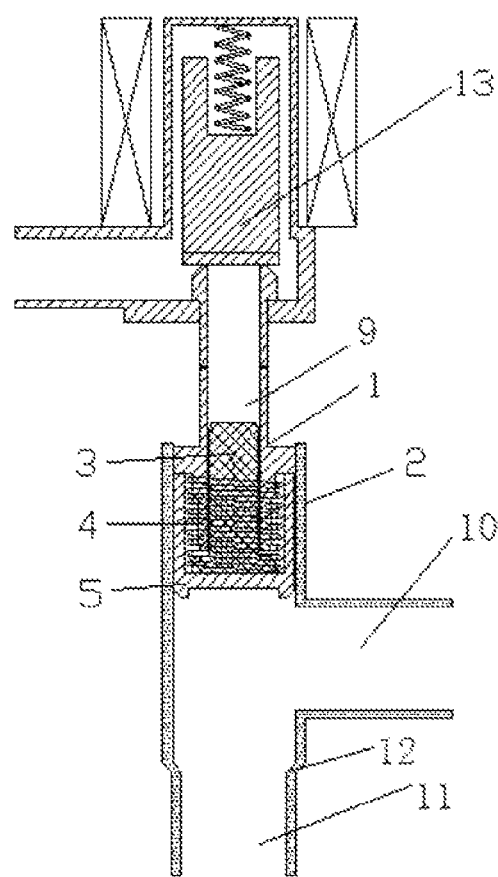
FIG. 10 is a structural schematic diagram of the fifth embodiment the present invention.
Figure 11:
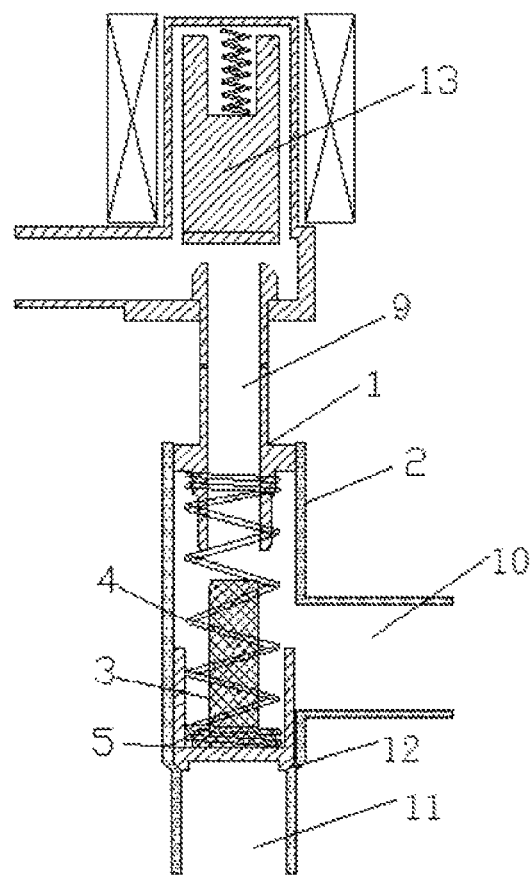
FIG. 11 is a schematic diagram of the defrosting valve in an operating mode as shown in FIG. 10.

Embodiment 5: a defrosting valve (see FIGS. 10-11), having basically the same structure and principle with that of embodiment 1; the differences thereof are: the upper cover 1 of the defrosting valve is connected to the defrosting solenoid valve 13; and the flow channel inlet 9 of the upper cover 1 is integrally connected to the air outlet of the defrosting solenoid valve, forming a valve group.

I claim:

1. A defrosting valve, characterized by comprising a valve body provided with a valve core therein and an upper cover thereon; a push piston is disposed in the valve core; the push piston is in a T-shape; the upper part of the push piston is inserted in the cavity of the upper cover; a return tension spring is sleeved at the lower part of the upper cover; the upper end of the return tension spring is connected to the upper cover, and the lower end of the return tension spring is connected to the lower end of the push piston; a lower table top is disposed at the lower part of the valve body; a flow channel inlet is disposed on the upper cover; a bidirectional flow channel opening is disposed on the side wall of the valve body; and a flow channel outlet is disposed at the lower end of the valve body.

2. The defrosting valve according to claim 1, characterized in that the calibers of the bidirectional flow channel opening and the flow channel outlet are both greater than the caliber of the flow channel inlet.

3. The defrosting valve according to claim 1, characterized in that the distance from the lower table top to the upper edge of the bidirectional flow channel opening is larger than the diameter of the bidirectional flow channel opening.

4. The defrosting valve according to claim 1, characterized in that the height of the valve core is greater than the diameter of the bidirectional flow channel opening.

5. The defrosting valve according to claim 1, characterized in that a sealing gasket is disposed at the lower end of the valve core.

6. The defrosting valve according to claim 1, characterized in that a flow channel is disposed in the push piston; a small valve core is disposed in the flow channel at the lower part of the push piston; a spring is sleeved on the small valve core; the upper end of the spring is connected to the small valve core, and the lower end is connected to the valve core; the valve core is provided with a through hole thereon; and the lower end of the small valve core corresponds to the through hole.

7. The defrosting valve according to claim 1, characterized in that the upper cover of the defrosting valve is connected to the defrosting solenoid valve; and the flow channel inlet of the upper cover is integrally connected to the air outlet of the defrosting solenoid valve.

* * * * *